US007817221B2

(12) United States Patent
Kamiguchi

(10) Patent No.: US 7,817,221 B2
(45) Date of Patent: Oct. 19, 2010

(54) IMAGE DISPLAY APPARATUS

(75) Inventor: Kinya Kamiguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 12/273,910

(22) Filed: Nov. 19, 2008

(65) Prior Publication Data

US 2009/0154077 A1 Jun. 18, 2009

(30) Foreign Application Priority Data

Dec. 18, 2007 (JP) ............................ 2007-325803

(51) Int. Cl.
*G02F 1/1333* (2006.01)
*H04N 5/645* (2006.01)

(52) U.S. Cl. .......................... 349/58; 349/56; 349/122; 361/679.01

(58) Field of Classification Search .................. 349/58, 349/56, 122, 123, 158, 160, 187, 190, 191; 257/724; 361/679.01; 438/30
See application file for complete search history.

(56) References Cited

U.S. PATENT DOCUMENTS

| | | | | |
|---|---|---|---|---|
| 5,016,987 | A * | 5/1991 | Smith, Jr. | 349/153 |
| 6,361,389 | B1 * | 3/2002 | Hogue et al. | 445/24 |
| 6,506,087 | B1 * | 1/2003 | Fushimi et al. | 445/24 |
| 7,029,358 | B2 | 4/2006 | Ando | 345/30 |
| 7,110,080 | B2 * | 9/2006 | Matsumoto | 349/155 |
| 2004/0001032 | A1 * | 1/2004 | Ando | 345/30 |
| 2005/0051892 | A1 | 3/2005 | Andoh | 257/724 |
| 2005/0140913 | A1 | 6/2005 | Yokota et al. | 349/153 |
| 2005/0151475 | A1 | 7/2005 | Sasaki et al. | 313/382 |
| 2006/0228951 | A1 | 10/2006 | Kamiguchi et al. | 438/753 |
| 2007/0171350 | A1 | 7/2007 | Andoh | 349/153 |
| 2007/0188757 | A1 * | 8/2007 | Amsden et al. | 356/401 |
| 2007/0247054 | A1 | 10/2007 | Seon et al. | 313/495 |
| 2009/0154077 | A1 * | 6/2009 | Kamiguchi | 361/679.01 |

FOREIGN PATENT DOCUMENTS

| | | | |
|---|---|---|---|
| CN | 1595584 | 3/2005 | 349/58 X |
| EP | 1 288 994 A2 | 3/2003 | |

(Continued)

OTHER PUBLICATIONS

European Search Report dated Feb. 24, 2010, in related corresponding European Patent Application No. 08170616.0.

(Continued)

*Primary Examiner*—Brian M Healy
(74) *Attorney, Agent, or Firm*—Fitzpatrick, Cella, Harper & Scinto

(57) ABSTRACT

An image display apparatus includes an envelope including a first substrate provided with an image display unit, a second substrate placed in opposition to the first substrate, and an outer frame to form a space between the first and second substrates, and a low melting point metal disposed between the first and second substrates for hermetically seal bonding the first substrate and the second substrate. In addition, an adhesive is placed along an outer periphery of the envelope except for at least one side of the envelope. The adhesive contacts both a surface of the first substrate not facing the second substrate and a surface of the second substrate facing the first substrate, with the adhesive being one of an epoxy adhesive, an acrylic adhesive, and a ceramic adhesive.

20 Claims, 4 Drawing Sheets

FOREIGN PATENT DOCUMENTS

| | | | | |
|---|---|---|---|---|
| JP | 2000-090829 | A | 3/2000 | |
| JP | 2000-090830 | A | 3/2000 | |
| JP | 2000-251807 | A | 9/2000 | |
| JP | 2002-343282 | A | 11/2002 | |
| JP | 2004-87475 | | 3/2004 | ............... 349/58 X |

OTHER PUBLICATIONS

Chinese Official Letter dated Dec. 4, 2009, in related corresponding Chinese Patent Appln. No. 200810185207.5.

* cited by examiner

IMAGE DISPLAY APPARATUS

BACKGROUND OF THE INVENTION

1. Field of the Invention

The present invention relates to an image display apparatus, and in particular, to a bonding structure between substrates of an image display apparatus.

2. Description of the Related Art

An image display apparatus using a surface conduction electron-emitting device or a field emission electron-emitting device is known. In this kind of image display apparatus, a substrate in which an image display unit is formed, and a substrate in which an electron-emitting source is formed are arranged oppositely, and structure in which these substrates are bonded through an outer frame is common. Specifically, the outer frame is firmly fixed to one side of a substrate with frit (low melting point glass), the outer frame and another side of the substrate are sealed with a bonding member, and an envelope is formed. As the bonding member, a low melting point metal, such as In (indium), is used. A space between substrates, that is, an interior of the envelope becomes a vacuum apace, and the internal space is sealed from the external with the bonding member.

Usually, although each substrate is formed with glass as a base material, distortion resulting from differences between thermal expansions of substrates may arise in each substrate by factors, such as a temperature difference between one substrate and another substrate which arises at the time of use. When both of the substrates generate a relative position shift, there is a possibility that an electron beam emitted from an electron source may be radiated in a position shifting from a desired position of an image display unit, and may cause deterioration of image quality by this distortion. Then, construction of having reinforcing structure of including an inorganic adhesive and the like, whose principal component is silica alumina, in an outside of an envelope sealed with a bonding member is disclosed in Japanese Patent Application Laid-Open No. 2004-087475. The adhesive (reinforcing structure) is formed between both substrates using a dispenser or the like to fix both substrates firmly. Thereby, the position shift between the substrates resulting from the difference between thermal expansions is prevented.

The reinforcing structure disclosed in Japanese Patent Application Laid-Open No. 2004-087475 is effective in order to prevent a position shift between both substrates, but since the substrates are restrained mutually, distortion resulting from the difference between thermal expansions may arise in the substrates. When the distortion arises in the substrates, even if the position shift between the substrates is prevented, breakdown of the substrate may be caused and there is a possibility of reducing reliability as an image display apparatus.

SUMMARY OF THE INVENTION

Then, the present invention aims to provide an image display apparatus which can achieve both of prevention of a position shift between substrates and suppression of distortion generated in the substrates.

The image display apparatus of the present invention has an envelope including a first substrate provided with an image display unit, a second substrate placed in opposition to the first substrate, and a bonding member for hermetically seal bonding the first substrate to the second substrate so as to form a space between the first and second substrates. The image display apparatus of the present invention further has a position fixing member which is bonded with both of the first and second substrates along one side of an outer periphery of the envelope, for fixing a relative position between the first and second substrates.

The image display apparatus constructed in this way not only maintains an advantageous effect of suppressing a position shift between both substrates by the position fixing member since the position fixing member is placed along a part of an outer periphery of the bonding member, but also suppresses a restraint between the first and second substrates to suppress distortion generated in the substrates.

Further features of the present invention will become apparent from the following description of exemplary embodiments with reference to the attached drawings.

DESCRIPTION OF THE EMBODIMENTS

An image display apparatus of the present invention is widely applicable to an image display apparatus including an envelope including a first substrate provided with an image display unit, a second substrate placed in opposition to the first substrate, and a bonding member for hermetically seal bonding the first substrate to the second substrate so as to form a space between the first and second substrates. Such image display apparatuses include a liquid crystal display, a plasma display, an electron beam display, and the like. In addition, hermetically seal bonding of first and second substrates includes not only directly bonding of the first and second substrates, but also bonding of the first and second substrates through an outer frame. Since a liquid crystal display and an electron beam display are formed by bonding two substrates in a periphery, they are desirable forms to which the present invention is applied.

First Embodiment

Figure 1:
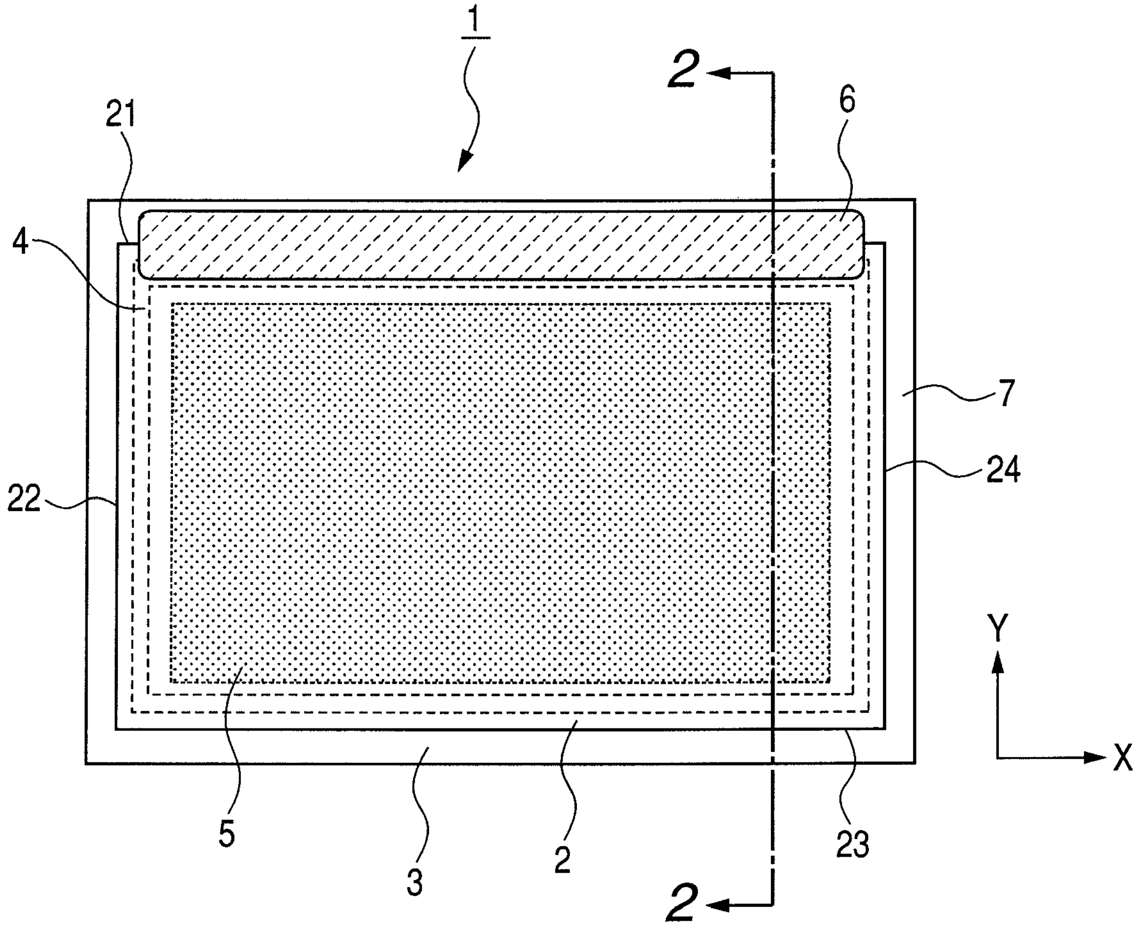
FIG. 1 is a schematic diagram of a first embodiment of the present invention.
Figure 2:
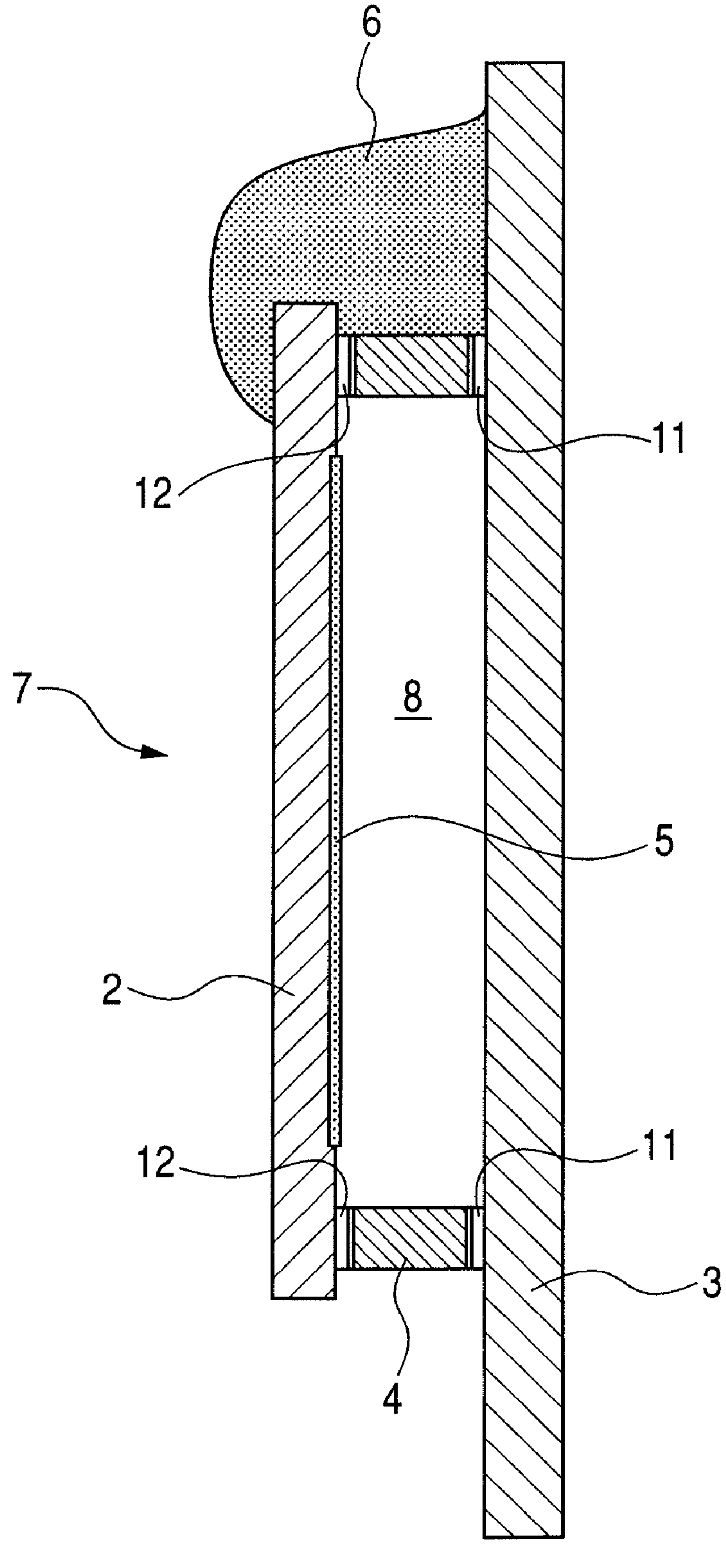
FIG. 2 is a sectional view along line 2-2 in FIG. 1.

FIGS. 1 and 2 are a front view of an image display apparatus illustrating a first embodiment of the present invention, and a sectional view along line 2-2 in FIG. 1, respectively. The first embodiment is the image display apparatus in which a surface conduction electron-emitting device is used.

The first substrate 2 includes an image display unit 5 including a phosphor (not illustrated) and the like. The second substrate 3 includes an electron-emitting source (not illustrated), and is provided with being placed in opposition to the first substrate 2. From the electron-emitting source, electrons are emitted according to an image signal, and collide with the phosphor, the phosphor emits light, and a desired image is displayed. A space 8 is formed between the first substrate 2 and the second substrate 3. The first substrate 2 and the second substrate 3 are bonded through an outer frame 4, and construct an envelope 7 whose interior is made into a vacuum. Since the first substrate 2 and the second substrate 3 are substantially rectangular substrates, the envelope 7 also has a substantially rectangular shape.

The second substrate 3 and the outer frame 4 are firmly bonded with a frit 11. The first substrate 2 and the outer frame 4 are bonded by a bonding member 12. As the bonding member 12, it enables to use low melting point metals, such as In and an InAg alloy. The bonding member 12 hermetically seal bonds (seals) the second substrate 3 and the outer frame 4.

A position fixing member 6 is provided along a part of an outer periphery of the envelope 7. As the position fixing member 6, an epoxy adhesive, an acrylic adhesive, a ceramic adhesive, or the like can be used, and in particular, the epoxy adhesive is desirable in view of mechanical strength and working efficiency. The position fixing member 6 may include a metal member and a glass member. Although being provided in contact with the outer frame 4 in this embodiment, the position fixing member 6 may be formed separately from the outer frame 4. That is, a space may be provided between the outer frame 4 and the position fixing member 6. The position fixing member 6 is provided so as to contact both of the first substrate 2 and the second substrate 3, and suppresses the position shift between the first substrate 2 and the second substrate 3. The position shift becomes easily remarkable when a low melting point metal in which deformation by creep tends to be generated easily is used as the bonding member 12, and in particular, this embodiment is effective to such an envelope.

The position fixing member 6 is provided only along a side 21 of the envelope 7. Of course, the position fixing member 6 may be provided only along any one of sides 22, 23, and 24 of the envelope 7. Thereby, it enables to prevent the relative position shift between the first substrate 2 and the second substrate 3. In addition, since the substrates 2 and 3 are restrained only in the side 21, the position fixing member 6 does not generate a binding effect in a Y direction in FIG. 1, and a binding force is limited also in an X direction. Since an installation range of the position fixing member 6 is also limited, it is desirable also from a standpoint of member cost and a process tact to provide the position fixing member 6 only in one side.

The position fixing member 6 can be provided by a maximum of three sides among sides 21, 22, 23, and 24 of the envelope 7. While maintaining the relative position shift between the substrates 2 and 3 to such an extent of not becoming a problem by providing the position fixing member 6 except for at least one side of the envelope 7 (in this embodiment, by providing it only in one side) in this way, it enables to suppress distortion of the substrates 2 and 3 resulting from the thermal expansion difference between the substrates 2 and 3. Hence, it enables to maintain relative positional relation between the substrates 2 and 3 in a normal range with preventing breakage of the substrates 2 and 3, and the like. The position shift between the first substrate 2 and the second substrate 3 is caused by differences between distortions of respective substrates 2 and 3, residual stresses resulting from production processes, such as deformation at the time of adhesion, and thermal expansion amounts generated by a temperature change at the time of use. Hence, as for the installation range of the position fixing member 6, it is desirable to determine suitably according to magnitudes of these residual stresses and temperature change. Note that, as mentioned above, generally, it is desirable to provide the position fixing member 6 only in one side.

The image display apparatus of this embodiment can be manufactured schematically as follows. The first substrate 2 and the second substrate 3 in which the surface conduction electron-emitting device (not illustrated) is mounted are prepared, the frame 4 is sandwiched between peripheral portions of these, and these are bonded using the frit 11 and the bonding member 12. The envelope 7 is manufactured by exhausting from an exhaust hole not illustrated after adhesion, and sealing the exhaust hole. Next, after manufacturing the envelope 7, with keeping a posture of the envelope 7 horizontal, the position fixing member 6 (adhesive) is applied with a dispenser, and is cured by natural drying. The image display apparatus manufactured in this way was able to display a good image.

Second Embodiment

Figure 3:
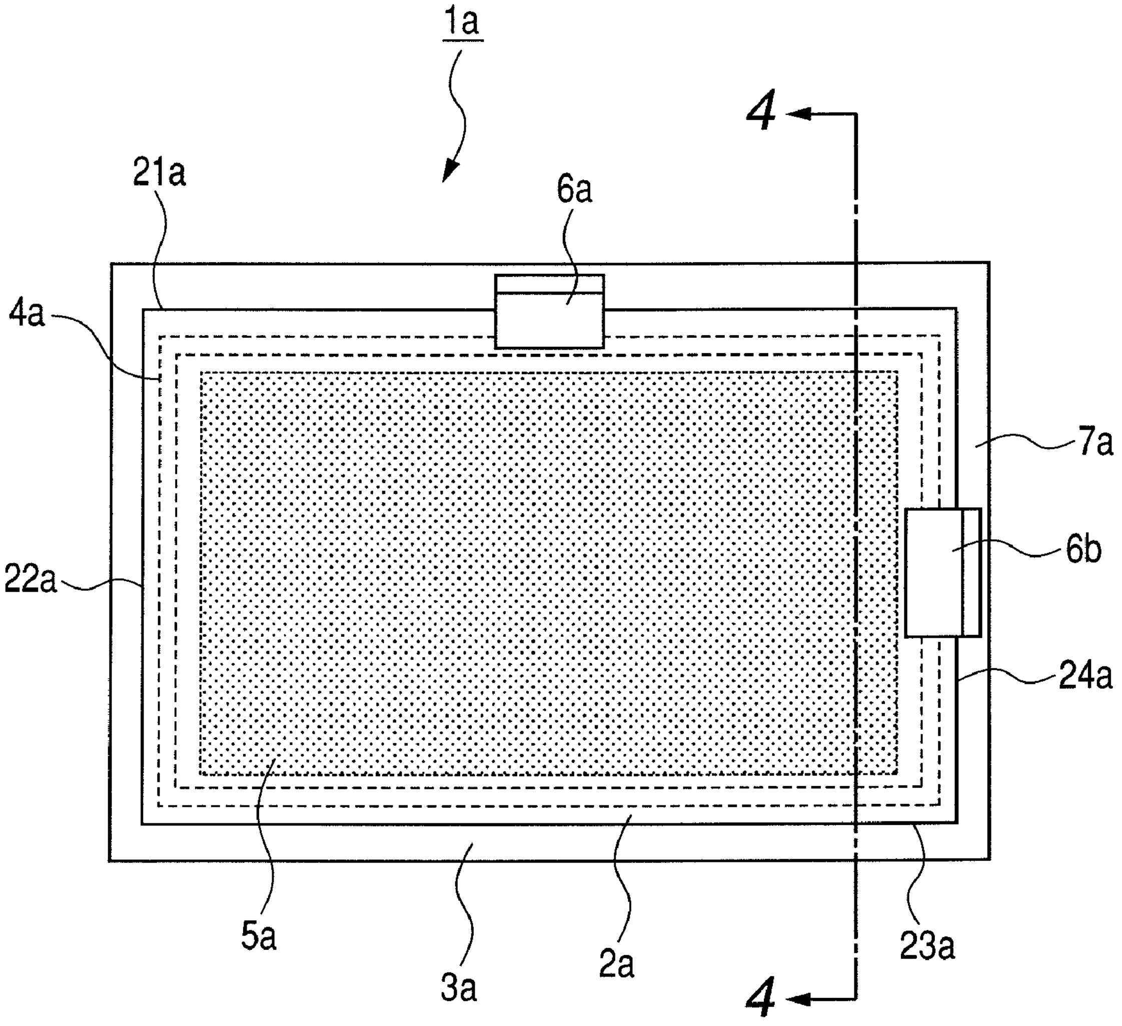
FIG. 3 is a schematic diagram of a second embodiment of the present invention.
Figure 4:
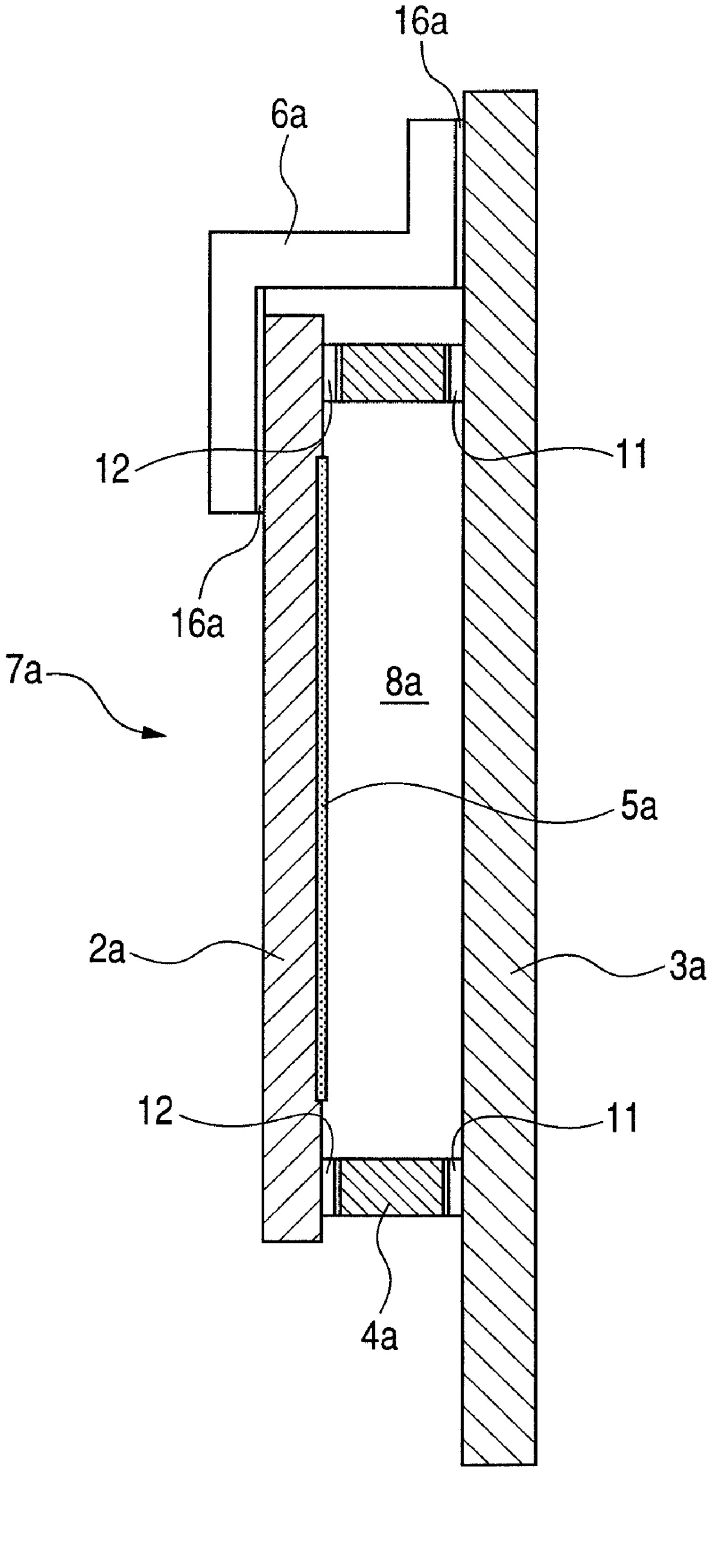
FIG. 4 is a sectional view along line 4-4 in FIG. 3.

FIGS. 3 and 4 are a front view of an image display apparatus illustrating a second embodiment of the present invention, and a sectional view along line 4-4 in FIG. 3, respectively. Although being the image display apparatus which uses a field emission device, the second embodiment is also applicable similarly to another image display apparatus, such as an image display apparatus using a surface conduction electron-emitting device, or a liquid crystal display. The second embodiment is the same as the first embodiment except construction and an installation method of a position fixing member differing from the first embodiment besides this point.

In this embodiment, position fixing members 6*a* and 6*b* are provided so as to connect the first substrate 2*a* and the second substrate 3*a* to only parts of two sides 21*a* and 24*a* of the envelope 7*a* being adjacent to each other. The position fixing members 6*a* and 6*b* are metal members made of an Fe-47Ni alloy, and are bonded with the substrates 2*a* and 3*a* using a ceramic adhesive 16*a*. Since a coefficient of thermal expansion of the Fe-47Ni alloy is close to both coefficients of thermal expansion of the first substrate 2*a* and the second substrate 3*a*, a thermal stress is hard to be generated on bonded surfaces of the substrates 2*a* and 3*a*. Hence, the substrates 2*a* and 3*a* are prevented from receiving large distortion locally.

In this embodiment, although being provided on two adjacent sides (position fixing members 6*a* and 6*b*) of the envelope 7*a*, the position fixing member may be provided in a part of any one of sides similarly to the first embodiment, or the position fixing members may be provided in three adjacent sides, or two opposite sides. Nevertheless, since the position shift suppressing effect of each position fixing member is small in comparison with the position fixing member 6 of the first embodiment, totally two position fixing members are provided in the adjacent sides in this embodiment. In addition, sizes (a range) of the position fixing members 6*a* and 6*b* do not need to be as illustrated, but can be suitably set in consideration of the residual stress resulting from distortion of the respective substrates 2 and 3, deformation at the time of bonding, or the like, difference between thermal expansion amounts by a temperature change at the time of use, or the like. The number of the position fixing members attached to each side is not limited to one piece, but after taking the above-mentioned conditions into consideration, more than one can also be provided so as to fit in a permissible range of thermal stress.

The position fixing members 6*a* and 6*b* are placed at centers of sides 21*a* and 24*a* in which the position fixing members 6*a* and 6*b* are provided. As a result, the first substrate 2*a* and the second substrate 3*a* are fixed at the centers of the sides 21*a* and 24*a* of the envelope 7*a*, position shifts are generated with centering the centers of the sides 21*a* and 24*a*, and distortions are also generated with centering the centers. Hence, in comparison with the case of fixing the first substrate 2*a* and the second substrate 3*a* in corner sections of the envelope 7*a*, position shifting and distortion magnitude can be suppressed by half. Thereby, it also enables to reduce color degrading resulting from a position shift, and the like.

The image display apparatus of this embodiment can be manufactured almost similarly to that of the first embodiment. Similarly to the first embodiment, after manufacturing an envelope 7*a*, a posture of the envelope 7*a* is kept horizontal, the position fixing members 6*a* and 6*b* are pressed on bonding surfaces of the substrates 2*a* and 3*a*, to which the adhesive 16*a* is applied using a dispenser, and the adhesive 16*a* is cured by natural drying with being pressed. In an example, each bonding area of the position fixing members 6*a* and 6b, and the first substrate 2*a* and the second substrate 3*a* was set in 500 $mm^2$. The image display apparatus manufactured in this way was able to display a good image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-325803, filed Dec. 18, 2007, which is hereby incorporated by reference herein in its entirety.

What is claimed is:

1. An image display apparatus comprising:

an envelope including a first substrate provided with an image display unit, a second substrate placed in opposition to the first substrate, and an outer frame to form a space between the first and second substrates, and a low melting point metal disposed between the first and second substrates for hermetically seal bonding the first substrate and the second substrate; and an adhesive placed along an outer periphery of the envelope except for at least one side of the envelope, wherein the adhesive contacts both a surface of the first substrate not facing the second substrate and a surface of the second substrate facing the first substrate, with the adhesive being one of an epoxy adhesive, an acrylic adhesive, and a ceramic adhesive.

2. The image display apparatus according to claim 1, wherein the adhesive is placed along only one side of the envelope or along only two sides of the envelope adjacent to each other.

3. The image display apparatus according to claim 1, wherein the adhesive is the epoxy adhesive.

4. The image display apparatus according to claim 1, wherein the adhesive is cured by natural drying.

5. The image display apparatus according to claim 1, wherein the the first and second substrates generate a different thermal expansion amount at a time of use.

6. The image display apparatus according to claim 1, wherein the outer frame is bonded to the first substrate through the low melting point metal, and the adhesive contact area of the surface of the first substrate is an orthogonal projection from the outer frame.

7. The image display apparatus according to claim 6, wherein the outer frame is bonded to the second substrate through a low melting point glass.

8. The image display apparatus according to claim 1, wherein the low melting point metal is In or InAg alloy.

9. The image display apparatus according to claim 1, wherein the first substrate has a phosphor layer and the second substrate is provided with an electron emitting source, and the space between the first and second substrates is a vacuum.

10. An image display apparatus comprising:

an envelope including a first substrate provided with an image display unit, a second substrate placed in opposition to the first substrate, and an outer frame to form a space between the first and second substrates, and a low melting point metal disposed between the first and second substrates for hermetically seal bonding the first substrate and the second substrate; and a metal member placed along an outer periphery of the envelope except for at least one side of the envelope;

wherein the metal member is bonded with an adhesive to both a surface of the first substrate not facing the second substrate and a surface of the second substrate facing the first substrate.

11. The image display apparatus according to claim 10, wherein the metal member is placed along only two sides of the envelope adjacent to each other.

12. The image display apparatus according to claim 10, wherein the first and second substrates have different coefficients of thermal expansion, and the metal member has a coefficient of thermal expansion which is between the coefficient of thermal expansion of the first substrate and the coefficient of thermal expansion of the second substrate.

13. The image display apparatus according to claim 12, wherein the first and second substrates are formed with glass as a base material and the metal member is made of Fe—Ni alloy.

14. The mage display apparatus according to claim 10, wherein the adhesive is cured by natural drying.

15. The image display apparatus according to claim 10, wherein the first and second substrates generate a different thermal expansion amount at a time of use.

16. The image display apparatus according to claim 10, wherein the outer frame is bonded to the first substrate through the low melting point metal, and the metal member is provided separately from the outer frame.

17. The image display apparatus according to claim 10, wherein the outer frame is bonded to the first substrate through the low melting point metal, and the metal member is bonded to an area of the surface of the first substrate that is an orthogonal projection from the outer frame.

18. The image display apparatus according to claim 17, wherein the outer frame is bonded to the second substrate through a low melting point glass.

19. The image display apparatus according to claim 10, wherein the low melting point metal is In or InAg alloy.

20. The image display apparatus according to claim 10, wherein the first substrate has a phosphor layer and the second substrate is provided with an electron emitting source, and the space between the first and second substrates is a vacuum.

* * * * *